(12) United States Patent
Thevenon et al.

(10) Patent No.: US 12,332,648 B2
(45) Date of Patent: Jun. 17, 2025

(54) METHODS AND SYSTEMS FOR MANAGING A VEHICLE FLEET

(71) Applicant: HAULOTTE GROUP, Lorette (FR)

(72) Inventors: Luc Thevenon, Saint-Etienne (FR); Romain Hourne, Brignais (FR); Christophe Silveira, Saint Genis Laval (FR)

(73) Assignee: HAULOTTE GROUP, Lorette (FR)

(*) Notice: Subject to any disclaimer, the term of this patent is extended or adjusted under 35 U.S.C. 154(b) by 268 days.

(21) Appl. No.: 18/029,993

(22) PCT Filed: Oct. 7, 2021

(86) PCT No.: PCT/EP2021/077765
§ 371 (c)(1),
(2) Date: Apr. 3, 2023

(87) PCT Pub. No.: WO2022/074147
PCT Pub. Date: Apr. 14, 2022

(65) Prior Publication Data
US 2023/0367316 A1 Nov. 16, 2023

(30) Foreign Application Priority Data
Oct. 8, 2020 (FR) ........................... 2010287

(51) Int. Cl.
*G05D 1/02* (2020.01)
*G05D 1/00* (2006.01)
*G07C 5/08* (2006.01)
*B66F 17/00* (2006.01)

(52) U.S. Cl.
CPC ......... *G05D 1/0212* (2013.01); *G05D 1/0027* (2013.01); *G07C 5/0808* (2013.01); *G07C 5/0825* (2013.01); *B66F 17/006* (2013.01); *G05D 1/0016* (2013.01)

(58) Field of Classification Search
CPC .. G05D 1/0212; G05D 1/0027; G05D 1/0016; G07C 5/0808; G07C 5/0825; B66F 17/006; G06Q 50/08; G06Q 30/0645
See application file for complete search history.

(56) References Cited

U.S. PATENT DOCUMENTS

2017/0240181 A1* 8/2017 Yu ........................... B60R 25/00
2020/0108795 A1 4/2020 Chapin

OTHER PUBLICATIONS

International Search Report for PCT/EP2021/077765, mailed Jan. 12, 2022, 4 pages.
Written Opinion of the ISA for PCT/EP2021/077765, mailed Jan. 12, 2022, 6 pages.
Search Report for FR2010287, dated Jun. 24, 2021, 2 pages.

* cited by examiner

*Primary Examiner* — Michael V Kerrigan
(74) *Attorney, Agent, or Firm* — NIXON & VANDERHYE

(57) ABSTRACT

Disclosed is a vehicle including a control system including a central processing unit and a communication interface, the central unit being configured to: receive a restriction of a functionality of the vehicle, via a communication interface; update a list of restriction policies based on the received restriction; and analyze the control orders issued by an operating console of the vehicle by comparing the orders to the restriction policies stored in the list and inhibiting one of the control orders to prohibit the use of a functionality corresponding to a restriction stored in the list of restriction policies.

20 Claims, 4 Drawing Sheets

METHODS AND SYSTEMS FOR MANAGING A VEHICLE FLEET

CROSS-REFERENCE TO RELATED APPLICATIONS

This application is the U.S. national phase of International Application No. PCT/EP2021/077765 filed Oct. 7, 2021 which designated the U.S. and claims priority to FR 2010287 filed Oct. 8, 2020, the entire contents of each of which are hereby incorporated by reference.

BACKGROUND OF THE INVENTION

Field of the Invention

Methods and systems for managing a fleet of vehicles, in particular work-site vehicles such as aerial work platforms or lifting vehicles.

Description of the Related Art

In general, fleet management systems exist, e.g. used by car rental companies, for managing a fleet of vehicles when the vehicles are rented to end users, e.g. for being used on work-sites.

In practice, said vehicles are generally rented to end users for very specific uses, for a predefined period of time, while being intended for remaining in a given geographical area.

In particular, in the case of work-site vehicles such as aerial work platforms or lifting vehicles, users need to be able to operate the vehicles safely.

It is thus desirable to be able to adapt the functions available for each vehicle according to the permissions given to users, which fleet management systems do not currently allow to do, in particular for construction vehicles such as aerial work platforms or lifting vehicles.

SUMMARY OF THE INVENTION

To this end, one aspect of the invention relates to a vehicle, in particular a work-site vehicle such as an aerial work platform or a lifting vehicle, the vehicle including a control system comprising a central unit and a communication interface, the central unit being configured for:
  receiving a restriction of a function of the vehicle, via the communication interface;
  updating a list of restriction policies according to the restriction received;
  analyzing the control orders issued by a vehicle control console by comparing said orders with restriction policies stored in said list, and inhibiting one of said control orders so as to prohibit the use of a function corresponding to a restriction stored in the list of restriction policies.

Due to the invention, the functions available for each vehicle can be adapted according to the permissions given to the users. In particular, it is possible to restrict one or more functions of the vehicle according to a fleet management policy, without endangering the vehicle or the operator thereof.

According to advantageous but non-mandatory aspects, such a system can incorporate one or a plurality of the following features, taken individually or according to any technically permissible combination:

the restriction relates to functions related to the movement of the vehicle, or to functions related to the use of a working part of the vehicle or of a tool associated with the vehicle.
  the restriction is associated with a predefined user profile.
  the restriction is defined so as to limit an action within a predefined range of values, where a plurality of ranges of values can be predefined and associated with different user profiles.
  the control console is configured for displaying an alert for informing a user when a restriction is active.
  which central unit is programmed, when a restriction has to be modified or added, for applying the restriction only after a restart of the vehicle or after a reset of the function concerned.
  the central unit interface is programmed for regularly updating the stored the restriction policies.
  the central unit is programmed for automatically implementing usage restrictions if the communication interface has been damaged or removed.

According to another aspect, the invention relates to a fleet management system including a vehicle according to any of the preceding claims and a computer server apt to be connected to the vehicle, wherein the computer server is configured for:
  defining, on the computer server, a restriction of at least one function of a vehicle
  sending said restriction to said vehicle via a communication link established between said computer server and a vehicle control system.

According to another aspect, the invention relates to a method for managing a fleet of vehicles, in particular work-site vehicles such as aerial work platforms or lifting vehicles, the method including the steps consisting of:
  defining, on a computer server of a fleet management system, a restriction of at least one function of a vehicle;
  sending said restriction to said vehicle via a communication link established between said computer server and a control system of the vehicle;
  by means of the control system of the vehicle, updating a list of restriction policies depending on the restriction received;
  by means of the control system of the vehicle, inhibiting a control order issued by a control console of the vehicle so as to prohibit the use of a function corresponding to a restriction stored in the list of restriction policies

BRIEF DESCRIPTION OF THE DRAWINGS

The invention will be better understood, and other advantages thereof will appear more clearly in the light of the following description of an embodiment of a method for managing a vehicle fleet and an associated system, given only as an example and made with reference to the enclosed drawings, wherein.

DESCRIPTION OF THE PREFERRED EMBODIMENTS

Figure 1:
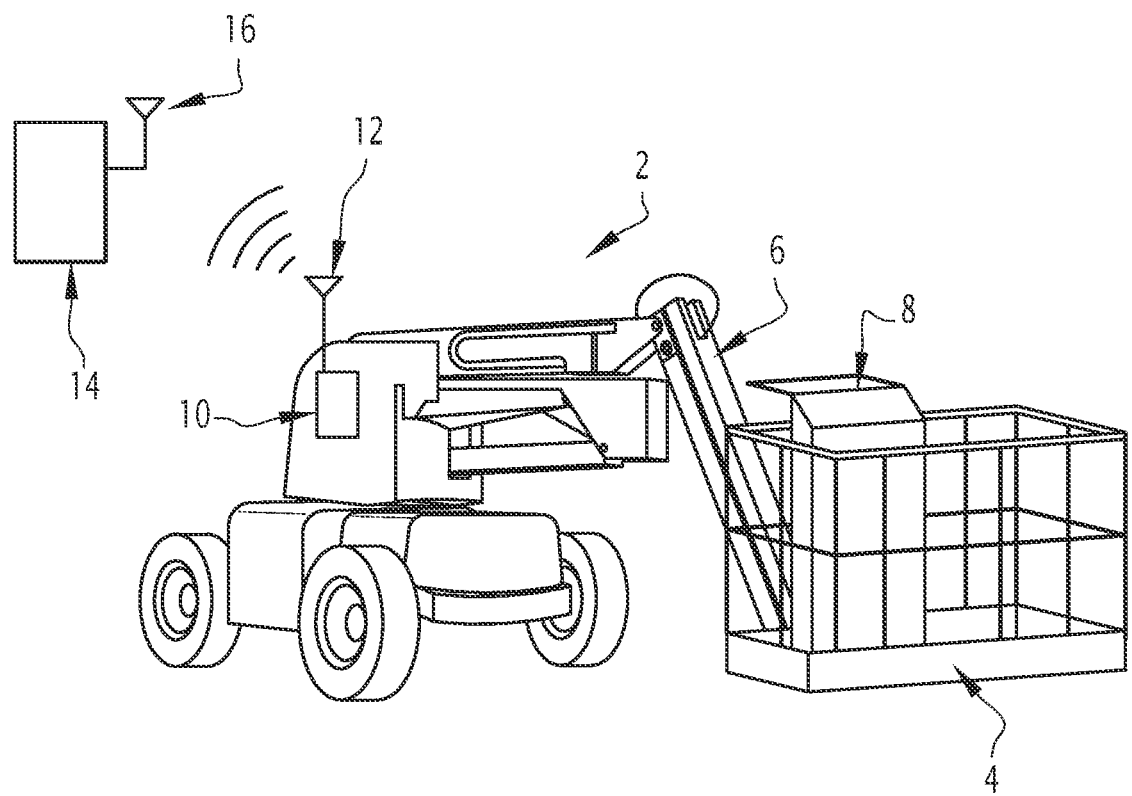
FIG. 1 shows a vehicle, in particular a work-site vehicle, and a fleet management system according to embodiments.

FIG. 1 shows a vehicle 2, in particular a work-site vehicle.

In the example illustrated, the vehicle 2 is a lifting vehicle, such as an aerial work platform.

The vehicle 2 includes a main part including wheels and a motor, which are e.g. mounted on a chassis of the vehicle 2.

In a variant, the wheels could be replaced by tracks, e.g. when the vehicle 2 is an earthmoving machine.

In the example shown in FIG. 1, the vehicle 2 also comprises a boom lift 4 intended to receive one or more persons.

The cradle 4 is connected to the main part of the vehicle 2 by one or a plurality of arms 6, such as articulated arms 6 or telescopic arms.

The arms 6 are articulated to one another and/or articulated to the main part and/or articulated to the cradle 4. The arms 6 e.g. can move under the effect of actuators, such as hydraulic cylinders.

The cradle 4 thus forms, with the arms 6, a working part of the vehicle 2, such as a tool which can be actuated by a user.

More particularly, two opposite configurations of the working part of the vehicle 2 can be distinguished:
- a folded configuration, wherein the arms 6 are retracted and/or folded, the cradle 4 then being located close to the ground and to the main part, and
- a deployed configuration, wherein the arms 6 are deployed and/or extended, the cradle 4 then being at height, e.g. several meters above the ground.

As a variant, in general, the vehicle 2 could be an industrial vehicle including at least one working part movable with respect to a main part of the vehicle, such as lifting equipment, or earthmoving equipment, or a handling equipment.

In practice, the working portion can be used for carrying a tool or can define a receiving volume for receiving one or several users or for carrying a live load.

Possible examples of such industrial vehicles include a dumper truck, or a forklift, or a truck with an articulated arm, or an excavator, or any equivalent industrial vehicle.

In such cases, different configurations of the working part, similar to the deployed and retracted configurations, can be defined in a similar manner depending upon the nature of the working part.

The vehicle 2 also comprises a control console 8, herein mounted in the cradle, and a control system 10, herein installed in the main part of the vehicle.

The control system 10 provides the operation of the vehicle 2, and in particular the movement of the working part between the various configurations thereof, or the movement of the vehicle 2 by means of the wheels and of the engine, depending on control orders entered by a user via the control console 8.

According to examples, the control console 8 can include one or a plurality of control devices such as a lever, a steering wheel, a joystick, switches, a display screen, measuring instruments, or any similar device.

The control console 8 can further include an electronic processing circuit, which can comprise a microcontroller or a microprocessor.

The control console 8 can further include an identification device, such as a magnetic card reader or a smart card reader, or a communication interface apt to be connected to a portable wireless communication device, or a key-operated electromechanical system.

The control system 10 is connected to a radio communication interface 12, comprising e.g. an antenna and an electronic processing circuit.

The communication interface 12 is configured e.g. for establishing a radio communication link, such as a short-range or long-range link, with a remote device.

The control system 10 can thus be connected to a remote computer server 14, the role of which will be specified thereafter, via a communication network.

The remote computer server 14 e.g. is part of a fleet management system.

Figure 2:
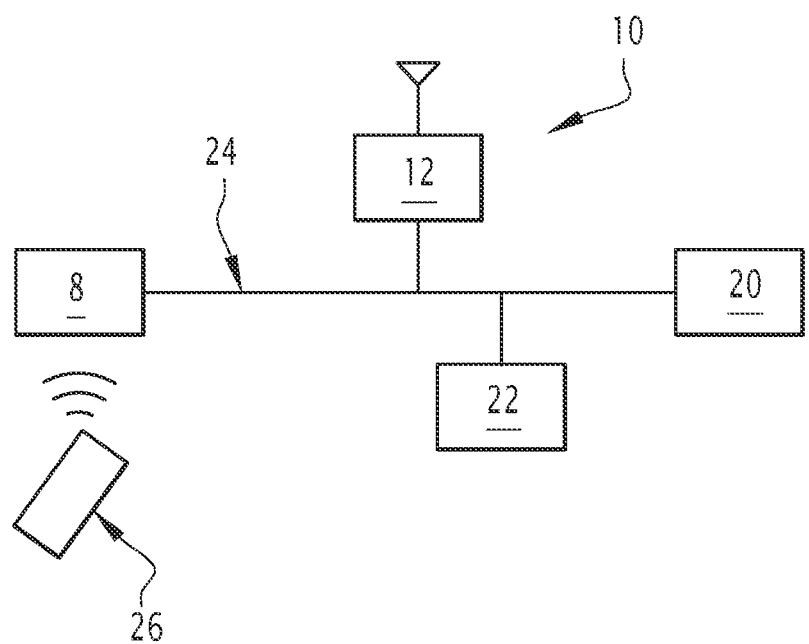
FIG. 2 diagrammatically shows a control system on board the vehicle shown in FIG. 1.

As illustrated in FIG. 2, the control system 10 includes an electronic data processing device 20, a control interface 22 for sending orders to the motor and the actuators, and a communication bus 24 which interconnects the electronic data processing device 20, the control interface 22 and the communication interface 12.

The electronic data processing device 20 e.g., herein called the "central unit", includes a processor, such as a microcontroller or a microprocessor, and a memory.

In the above example, the control interface 22 can include an electromechanical device or an electrical circuit which connects an output of the electronic device 20 to the motor and/or to one or a plurality of actuators, e.g. in order to send electrical control signals to the latter.

According to one embodiment, the communication bus 24 is a CAN bus, although other implementations are possible as a variant.

FIG. 2 also shows an identification object 26 which is apt to be detected by the identification device described hereinabove. The identification object 26 is used for identifying a user to the system 10.

The identification object 26 e.g. can be an electronic card, or a magnetic card, or a key, or an RFID device, or a mobile phone, or any suitable device.

In a variant, identification can be done by means of a password that the user enters on the console 8, e.g. by means of a dedicated interface, or by entering the password on a phone or mobile communication device the user owns and which is coupled to the desk 8.

In such variant, the identification object 26 is then not made necessary. The identification device is modified accordingly.

In many embodiments, the central unit 20 is configured for imposing usage restrictions, e.g. for limiting or inhibiting at least part of the functions of the vehicle 2.

Such usage restrictions are implemented by the central unit 20 according to restriction policies defined beforehand.

According to examples of embodiments, the central unit 20 includes a management module implemented by means of specific instructions stored in memory and executed by the processor. The management module is apt to intercept the control orders transiting on the bus 24 and can selectively either inhibit or authorize the execution of some of the orders.

When a user e.g. uses the console 8 for controlling the vehicle 2, corresponding movement orders are sent by the console 8 and are transmitted on the bus 24 to the central unit 20.

Said orders are received and processed by the central unit 20. Depending on whether or not restriction policies have been activated, the central unit 20 being able to execute some of the movement orders received and, on the other hand, inhibiting certain orders if the orders are contrary to a restriction policy.

The received orders e.g. are analyzed by the central unit 20 and are compared with the current restriction policies stored so as to determine whether the received order can be authorized or whether the order should be rejected.

If an order received is identified as an order which can be authorized, then the central unit 20 sends a control signal on the bus 24 to the interface 22, for controlling the corresponding actuator or actuators.

Otherwise, if a received order is identified as an order which cannot be authorized according to the restriction policies in force, then in such a case, the received order is inhibited by the central unit 20 and no corresponding control signal is sent to the interface 22.

Thereby, in general, the central unit 20 is configured for analyzing the orders same receives from a user controlling the vehicle 2, and for comparing the orders with the restrictions policies set in place.

As will be understood on reading what follows, the restriction policies are stored locally in the central unit 20 and can be modified remotely, e.g. via the remote computer server 14 by means of the management system.

According to non-limiting examples, the orders can relate to orders to move the vehicle 2, such as acceleration or braking orders for setting the vehicle 2 in motion (or otherwise to immobilize the vehicle), or orders to steer the wheels for turning the vehicle.

The orders can also be orders for controlling the working part of the vehicle 2, or more generally any actuatable tool associated with the vehicle 2. In the case of a lifting vehicle e.g., these can be orders aimed at extending or retracting the arms 6, or at raising the cradle 4 to a certain height.

Figure 3:
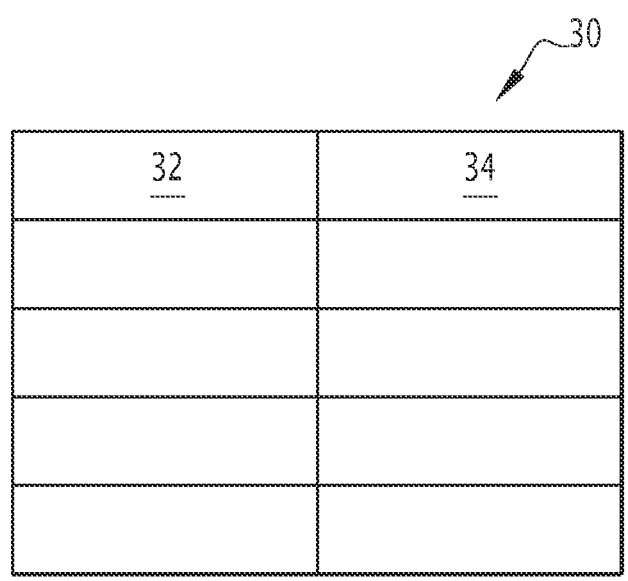
FIG. 3 shows an example of a list of restrictions for the vehicle shown in FIG. 1.

FIG. 3 very schematically represents an example of restriction policies stored in the central unit 20.

Such restriction policies e.g. are stored in a data structure 30, such as a table or list, or a database, or an equivalent. Such data structure is stored in the memory of the central unit, or in a data storage device coupled to the central unit 20.

Each restriction policy e.g. includes an identifier 32 which identifies a type of control order likely to be received by the central unit 20.

For each identifier 32, the restriction policy includes one or a plurality of attributes, which indicate under which circumstances the corresponding control order can be authorized or, otherwise, whether the order should be refused.

Specific restrictions e.g. can be set according to the profile of the user who issued the order from the console 8. Thus, each restriction policy can be associated with an attribute specifying to which predefined categories of users said restriction should apply. Then, when the central unit 20 compares the orders, the corresponding attribute can be compared with the user profile to which the user who sent the order or orders belongs. Said profile can be determined by an identification process, as explained hereinafter.

Attributes can relate to other aspects of the operation of the vehicle 2. Attributes can relate e.g. to date, vehicle speed, vehicle position, and many more other examples.

In practice, predefined profiles can be stored in the system 10, e.g. in a list of predefined profiles.

For each of the profiles, certain actions can be prohibited, either permanently or according to other criteria.

In other terms, each of the profiles can have user permissions of variable extent depending on the needs related to the user's profession, and also according to the accreditations of the user.

According to a non-limiting example, a list of profiles comprises at least one or more of the following profiles:
driver;
worker at height;
safety supervisor on a work-site;
transporter;
maintenance technician;
inspector;
owner of the vehicle.

In another example, profiles can be based on individual users, i.e. a profile can be associated with a single user.

In other words, the system 10 can include a list with the names of the users who each have specific permissions, which are defined by one or a plurality of restriction policies.

Preferentially, the system 10 is configured for automatically selecting a user profile from among the predefined profiles, e.g. by asking the user to identify themselves before being able to use the console 8.

Advantageously, the identification is done by means of the identification device of the console 8.

In certain embodiments, the identification can be done by an identification method comprising the following steps:
a) collecting an identification of the user, the user having identified themselves on the identification device, e.g. by means of an identification object 26;
b) identifying a profile of the user by choosing, from a predetermined list of profiles, a profile corresponding to the identity of the user, as collected during the step a).

Advantageously, when a user is identified, the console 8 can automatically indicate, e.g. on a screen or by luminous indicators, or on any other human-machine interface of the console 8, the functions which are accessible and the functions which are not accessible, depending on the restriction policies in force and according to the profile with which the identified user is associated.

Said information e.g. is automatically sent to the console 8, by the central unit 20.

Restriction policies can cover many aspects of the vehicle 2.

According to one example, a restriction policy can be defined so that the movements of the vehicle 2 are authorized only within a predefined geographical zone, and so as to prohibit any movement of the vehicle outside said geographical zone.

According to another example, a restriction policy can be defined so as to authorize the operation of the vehicle 2 only during certain hours of the day, and to prohibit any use of the vehicle outside said operating hours.

According to other examples, a restriction policy can be defined for limiting the speed of movement of the vehicle 2.

According to another example, a restriction policy can be defined for limiting the use of the working part, e.g. for limiting the deployment of the arm 6 or for limiting the height of the cradle 4.

A plurality of restrictions can be combined with each other, to form new restrictions policies.

Other restrictions can be defined, the examples given above not being limiting.

Advantageously, restriction policies can be defined for limiting an action within a predefined range of values.

The travel speed e.g. can be limited within a range of speed values. The height of the cradle can also be limited within a predefined range of height values. Similarly, the deployment length of the arm 6 can be restricted to a predefined interval of length values.

In a particularly advantageous way, a plurality of ranges of values can be predefined and associated with different user profiles.

A profile e.g. corresponding to a category of advanced users or users with high-level permissions can be associated with a wider interval of permissible values than a profile corresponding to a category of inexperienced users or users with restricted permissions.

In many embodiments, the restriction policies can be updated from the computer server 14.

A fleet manager e.g. can define restriction policies for each vehicle in the fleet thereof. Such policies can then be transmitted via a communication link to the interface 12 of the vehicle 2.

An aspect of the present invention is thus to propose a method aimed at adapting the use of the machine for blocking or authorizing certain functions, remotely. The functions of the vehicle 2 or of a tool associated with the vehicle can thus be adapted according to each customer. In this way it is possible to remotely adapt the configuration of the vehicle 2 and of the accessories thereof to the needs of the customer.

In particular, the system avoids providing a customer with a machine which would be overequipped compared to the need expressed by the customer, which prevents the customer from benefiting from undue services while preventing the customer from paying for the overequipping that the customer would not need.

Advantageously, the updating of the restriction policies stored in the control system 10 of the vehicle 2 can be carried out periodically.

According to an example of implementation, the electronic computer of the communication interface 12 is programmed for regularly interrogating the server 14 e.g. with a periodicity of 24 hours.

When the interface 12 detects that a restriction policy has been updated on the server 14, or that a new restriction policy has been created, or further that a restriction policy has been deleted, the corresponding information is downloaded by the interface 12 and then sent to the central unit 20. The latter automatically updates accordingly the list 30 of restriction policies.

Advantageously, the updating of the list 30 of restrictions can be implemented even when the vehicle 2 is stationary, e.g. when the ignition is switched off and the engine is turned off.

The interface 12 e.g. has a battery which allows same to operate even when the vehicle 2 is stationary. If the interface 12 detects that the restrictions have to be updated after having interrogated the server 14, then the interface 12 can be programmed for waking up the central unit 20 so as to notify same about the restriction to be updated.

Such notification can be carried out by means of the bus 24, or by means of a dedicated wire link (not shown) which connects the central unit 20 to the interface 12.

Optionally and yet advantageously, the central unit 20 is programmed for automatically implementing usage restrictions if the interface 12 has been damaged or has been removed or disconnected from the central unit 20. In practice, such restrictions can relate to essential functions of the vehicle 2. Said restrictions can be defined in advance in the central unit 20.

The above prevents a user from being able to prevent the update of restrictions by sabotaging the interface 12.

The central unit 20 e.g. is programmed for periodically interrogating the interface 12 by sending an interrogation signal over a wire link between the interface 12 and the central unit 20 as defined hereinabove.

In many embodiments, when a restriction has to be modified or added, the central unit 20 is programmed for not applying the restriction immediately, so as to avoid blocking the vehicle 2 in a potentially dangerous configuration.

Thereby, a new restriction is applied only after the vehicle is restarted, or after the function affected by the restriction has been reset to a stable and safe state.

When the restriction e.g. concerns the height of the cradle 4 or the length of the arm 6, it is preferable to apply the restriction only when the vehicle has been returned to the folded configuration, e.g. with the cradle 4 lowered to ground level and the arm 6 retracted.

Otherwise, if the restriction were to be applied immediately while the arm 6 is deployed or the cradle 4 is at height, a user could find his/herself blocked at height without any possibility to come down.

Similarly, if the restriction relates to the ability of the vehicle 2 to move, then it is preferential to wait until the vehicle 2 has restarted before applying the restriction, in order to prevent the vehicle from getting stuck in a dangerous location, e.g. in the middle of a crossroads.

Advantageously, when a restriction is active, the console 8 can display an alert for informing the user. The alert can be displayed by activating a luminous indicator and/or an audible indicator. The alert can also take the form of a message displayed on a display screen on the console 8, or on a communication device connected to the console 8.

Figure 4:
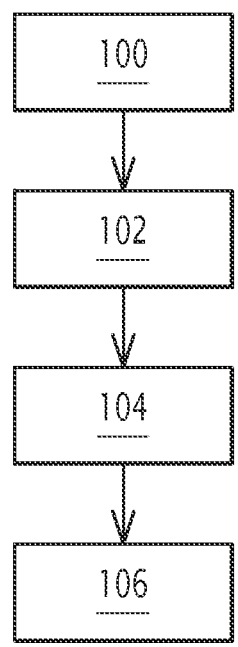
FIG. 4 is a flowchart schematically showing steps of a method for managing a fleet of vehicles according to embodiments.

An example of operation of the management system is shown in FIG. 4.

During a step 100, a new restriction is defined by the management system, e.g. in the computer server 14.

Such restriction can be defined by a manager, e.g. by being entered by means of a human-machine interface, or a web interface, or a communication device connected to the computer server 14. The latter thereby acquires the newly defined restriction or restrictions.

As shown earlier e.g. each restriction can be associated with one or a plurality of user profiles. Such profiles can be the profiles already defined in the vehicle 2 concerned, or there can be new profiles which will then be installed in the vehicle.

Each restriction can relate to a single vehicle 12, or else to a plurality of vehicles. The restriction can then be associated with one or a plurality of identifiers, each of which identifies a vehicle 2 in the fleet.

During a step 102, said restriction is transmitted to said vehicle 2 via a communication link established between said computer server 14 and the vehicle control system 10. The above is e.g. the aforementioned link set up by the communication interface 12.

During a step 104, the control system 10 updates the list 30 of restriction policies according to the restriction received.

Then, during a step 106, the control system 10 inhibits a control order issued by a control console 8 for prohibiting the use of a function corresponding to a restriction stored in the list of restriction policies.

As a variant, the method could be implemented differently. Such example does not prevent other steps from being implemented jointly and/or sequentially with said steps, in other embodiments.

The aforementioned embodiments and variants can be combined with each other so as to generate new embodiments.

The invention claimed is:

1. A vehicle, including a control system comprising a central unit and a communication interface, the central unit being configured for:
   receiving a restriction of a function of the vehicle, by means of the communication interface;
   updating a list of restriction policies according to the received restriction;
   analyzing control orders issued by a control console of the vehicle by comparing said control orders with restriction policies stored in said list, and inhibiting one of said control orders so as to prohibit the use of a function corresponding to a restriction stored in the list of restriction policies,
   wherein the central unit is programmed for, when a restriction is to be modified or added, applying the restriction only after a restart of the vehicle or after a reset of the function concerned.

2. The vehicle according to claim 1, wherein the restriction relates to functions related to the movement of the vehicle, or to functions related to the use of a working part of the vehicle or of a tool associated with the vehicle.

3. The vehicle according to claim 2, wherein the restriction is associated with a predefined user profile, and wherein the restriction is defined so as to limit an action within a predefined range of values, a plurality of ranges of values being predefined and associated with different user profiles.

4. The vehicle according to claim 3, wherein the control console is configured for displaying an alert for informing a user when a restriction is active.

5. The vehicle according to claim 3, wherein the interface of the central unit is programmed for regularly updating the stored restriction policies.

6. The vehicle according to claim 2, wherein the restriction is associated with a predefined user profile.

7. The vehicle according to claim 2, wherein the control console is configured for displaying an alert for informing a user when a restriction is active.

8. The vehicle according to claim 2, wherein the interface of the central unit is programmed for regularly updating the stored restriction policies.

9. The vehicle according to claim 2, wherein the central unit is programmed for automatically implementing usage restrictions if the communication interface has been damaged or removed.

10. The vehicle according to claim 1, wherein the restriction is associated with a predefined user profile.

11. The vehicle according to claim 10, wherein the control console is configured for displaying an alert for informing a user when a restriction is active.

12. The vehicle according to claim 10, wherein the interface of the central unit is programmed for regularly updating the stored restriction policies.

13. The vehicle according to claim 1, wherein the control console is configured for displaying an alert for informing a user when a restriction is active.

14. The vehicle according to claim 13, wherein the interface of the central unit is programmed for regularly updating the stored restriction policies.

15. The vehicle according to claim 1, wherein the interface of the central unit is programmed for regularly updating the stored restriction policies.

16. The vehicle according to claim 1, wherein the central unit is programmed for automatically implementing usage restrictions if the communication interface has been damaged or removed.

17. A fleet management system including a vehicle according to claim 1 and a computer server able to be connected to the vehicle, wherein the computer server is configured for:
   defining, on the computer server, a restriction of at least one function of a vehicle;
   transmitting said restriction to said vehicle via a communication link established between said computer server and a control system of the vehicle.

18. The vehicle according to claim 1, wherein the vehicle is a work-site vehicle.

19. The vehicle according to claim 18, wherein the work-site vehicle is an aerial work platform or a lifting vehicle.

20. A method for managing a fleet of vehicles, the method including steps consisting of:
   defining, on a computer server of a fleet management system, a restriction of at least one function of a vehicle;
   transmitting said restriction to said vehicle via a communication link established between said computer server and a control system of the vehicle;
   by means of the control system of the vehicle, updating a list of restriction policies according to the restriction received;
   by means of the control system of the vehicle, analyzing control orders issued by a control console of the vehicle by comparing said orders with restriction policies stored in said list, and inhibiting one of said control orders so as to prohibit the use of a function corresponding to a restriction registered in the list of restriction policies,
   wherein when a restriction has to be modified or added, the restriction is applied only after a restart of the vehicle or after a reset of the function concerned.

* * * * *